Feb. 10, 1942.   W. F. BOLDT   2,272,335
CAM-ACTUATED BRAKE
Filed Sept. 27, 1940   2 Sheets-Sheet 2
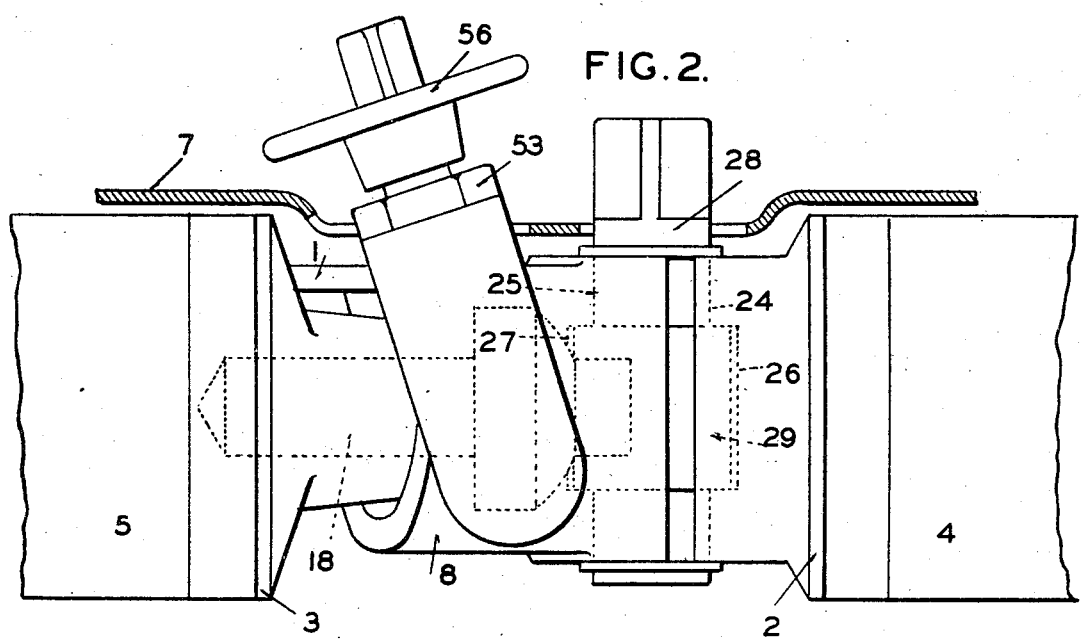
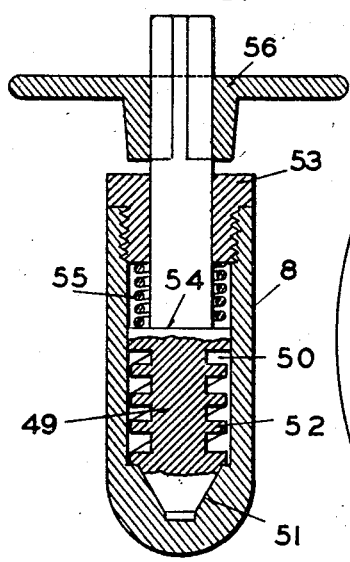
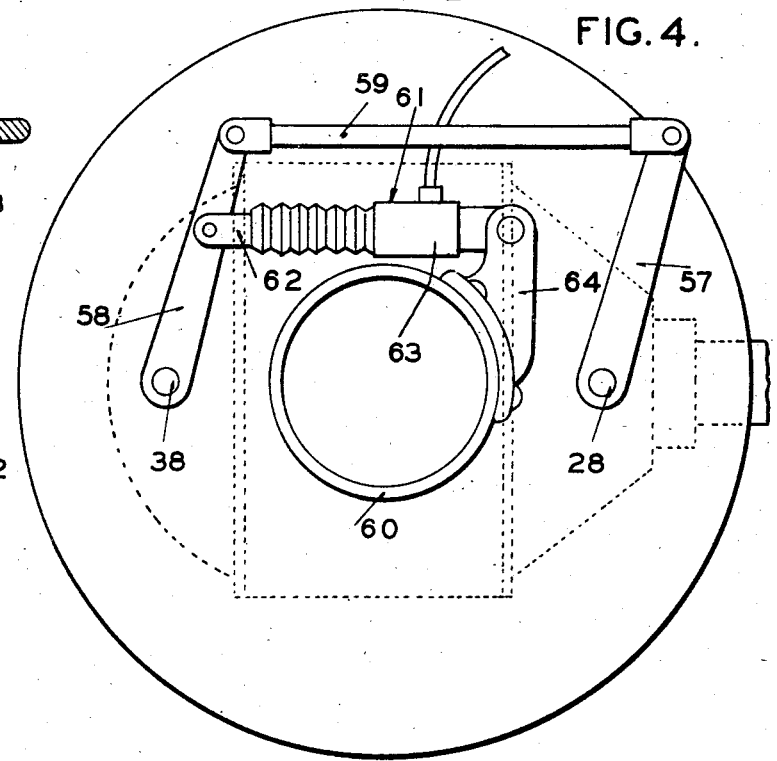
INVENTOR
W. F. BOLDT
BY
ATTORNEY Patented Feb. 10, 1942

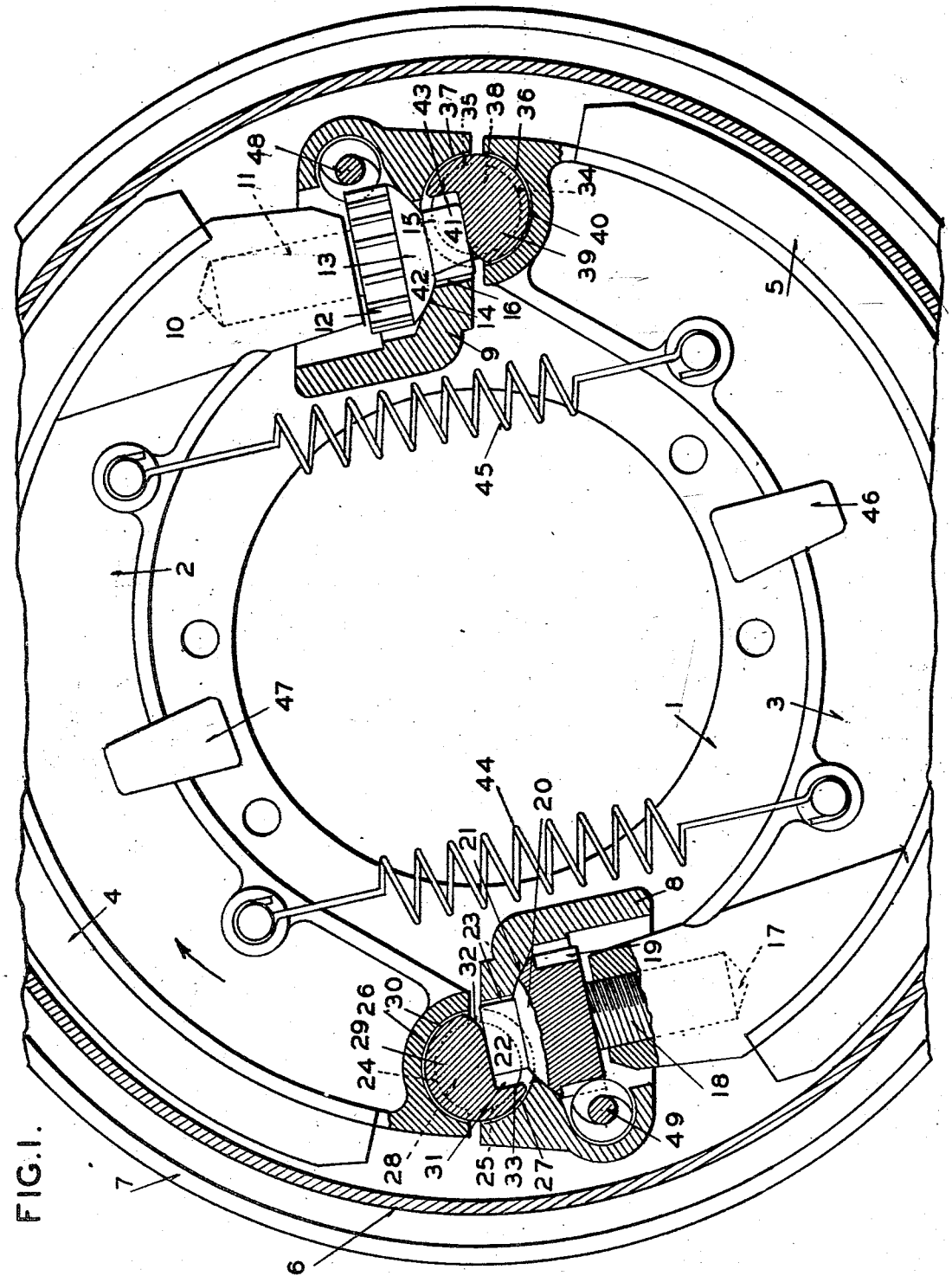

2,272,335

UNITED STATES PATENT OFFICE 2,272,335

CAM-ACTUATED BRAKE

Werner F. Boldt, Clayton, Mo., assignor to Wagner Electric Corporation, St. Louis, Mo., a corporation of Delaware Application September 27, 1940, Serial No. 358,578

9 Claims. (Cl. 188—78)

My invention relates to brakes and more particularly to a two shoe brake in which both shoes can act as "forward" shoes in either direction of rotation of the brake drum.

One of the objects of my invention is to produce an improved brake of the type referred to which is so constructed that each shoe is provided with a fixed anchor at each end and said shoes are actuated by two simultaneously operated diametrically positioned cams associated with the anchors and capable of floating movement.

Another object of my invention is to produce an improved combined anchor means and cam actuating means for the adjacent ends of two shoes which will be simple in construction and efficient in operation.

Still another object of my invention is to provide an improved manually-operated adjusting means for permitting the brake shoes to be easily and quickly adjusted to compensate for lining wear and without affecting the efficient operation of the brake.

Other objects of my invention will become apparent from the following description taken in connection with the accompanying drawings in which Figure 1 is a side view of a brake embodying my invention, parts being shown in section; Figure 2 is a view showing the adjusting means for one shoe and the relationship between one pair of adjacent ends of the shoes, the anchor and the actuating cam; Figure 3 is a sectional view of the adjusting screw; and Figure 4 is a view of the back side of the brake showing means for simultaneously actuating the cams.

Referring to the drawings in detail, numeral 1 indicates an annular spider forming the main support of the brake and secured to a fixed part of the vehicle such as the axle housing. Mounted on this support are two brake shoes 2 and 3 of like construction having lining portions 4 and 5 for cooperation with a drum 6 secured to a wheel of the vehicle to rotate therewith. The open side of this drum is enclosed by a dust plate 7 secured to the spider 1. On diametrically opposite sides of the spider and integrally formed therewith are two cup-shaped portions 8 and 9 constituting the anchors for the brake shoes.

The right end of shoe 2, as viewed in Figure 1, is provided with a threaded bore 10 for receiving a threaded adjusting member 11 having external gear teeth 12. The outer end of this threaded member is formed with a spherical surface 13 for cooperation with a spherical surface 14 in the bottom of the cup-shaped portion 9 carried by the spider and with a projection 15 extending through an opening 16 in said cup-shaped portion. Similarly the left end of shoe 3, as viewed in Figure 1, is provided with a threaded bore 17 threadably receiving an adjusting member 18 having gear teeth 19. The outer end of this member is provided with a spherical surface 20 for cooperation with the spherical surface 21 in the bottom of the cup-shaped portion 8 carried by the spider and with a projection 22 extending through an opening 23 in said cup-shaped portion.

The left end of shoe 2 has a semi-annular notch 24 which is complementary to a semi-annular notch 25 in the cup-shaped portion 8. The notches 24 and 25 are provided, respectively, with central semi-annular grooves 26 and 27. Journaled in the notches 24 and 25 is a cam shaft 28 carrying a cam 29 received in the grooves 26 and 27. This cam has a cylindrical surface 30 extending over substantially three-fourths of its circumference and a cut away portion 31 forming a cam surface 32 and a surface 33 substantially parallel to the radial line of the cam. In the normal inoperative position of the cam, the cut away portion 31 receives the extension 22 on the adjusting member 18 and the cam surface 32 lies adjacent the end of said extension.

The right end of shoe 3 has a semi-annular notch 34 which is complementary to a semi-annular notch 35 in the cup-shaped portion 9. The notches 34 and 35 are provided, respectively, with central semi-annular grooves 36 and 37. Journaled in the notches 34 and 35 is a cam shaft 38 carrying a cam 39 received in the grooves 36 and 37. This cam has a cylindrical surface 40 extending over substantially three-fourths of its circumference and a cut away portion 41 forming a cam surface 42 and a surface 43 substantially parallel to the radial line of the cam. In the normal inoperative position of the cam the cut away portion 41 receives the extension 15 on the adjusting member 11 and the surface 42 lies adjacent the end of said extension.

The notched end of shoe 2 is held in engagement with the cam shaft and the cam shaft is held in engagement with notch 25 on the cup-shaped portion 9 by means of a retractile spring 44 connected to the left ends of shoes 2 and 3. This spring also holds the spherical surface 20 of the adjusting member 18 against the spherical surface at the bottom of the cup-shaped portion 8. The notched end of shoe 3 is held in engagement with the cam shaft 38 and the cam shaft is held in engagement with the notch 35 in the cup-shaped portion 9 by means of a retractile spring 45 connected to the right ends of shoes 2 and 3. The spring also maintains the spherical surface 13 on the adjusting member 11 of shoe 2 in engagement with the bottom spherical surface of the cup-shaped portion 9. The shoes 2 and 3 have cooperating therewith guides 46 and 47 carried by the spider.

The adjusting member 11 for shoe 2 is controlled by a screw 48 journaled in a part of the cup-shaped portion 9 and the adjusting member 18 for shoe 3 is controlled by an adjusting screw 49 journaled in a part of the cup-shaped portion 8. Both of these screws extend to the outside of the dust plate 7 and since they are of like construction, only the adjusting screw 49 and its mounting is shown in detail in Figure 3. The part of the cup-shaped portion receiving the adjusting screw is formed with a bore 50 having a conical surface 51 at its closed end. The threads 52 on the screw are helically formed and the inner end of said screw is conical in order to cooperate with the conical surface 51. The bore 50 is closed by an annular nut 53 and interposed between this nut and a shoulder 54 is a spring 55 for forcing the conical end of the screw into engagement with the conical surface to thus produce such frictional contact that rotation of the screw will be prevented except by force. The outer end of the screw is provided with a suitable handle 56 whereby it can be turned by hand. The axis of the bore 50, as best shown in Figure 2, is positioned at such an angle with respect to the axis of the adjusting member that the gear teeth on said member will be so received between the threads 52 of the screw that the adjusting member is free to be moved in an axial direction and relative to the screw without rotation of the screw.

As shown in Figure 4, the exterior ends of the cam shafts 28 and 38 have secured thereto, respectively, upwardly extending levers 57 and 58 which are interconnected at their ends by a link 59 extending above the axle housing 60 having secured thereto the spider 1. Thus, when either lever is moved, the other lever will be simultaneously moved in the same direction. The means shown for actuating the levers comprises a fluid motor 61 having its piston (not shown) connected by means of a rod 62 to the intermediate portion of the lever 58 and its cylinder 63 pivotally mounted on a bracket 64 secured to the axle housing.

When the brake shoes are released from the drum by means of the retractile springs 44 and 45, the brake shoes and the cams will assume the positions shown in Figure 1. If the brake drum is traveling in the direction indicated by the arrow (considered the normal forward rotation of the wheel to which the drum is attached) and it is desired to apply the brakes, the fluid motor 61 is actuated. This will cause, by means of interconnected levers 57 and 58, the cam shafts 28 and 38 to be rotated in a clockwise direction as viewed in Figure 1. Rotation of the cams on the shafts will cause the adjacent ends of the shoes to be spread apart and the shoes engaged with the drum. As soon as shoe 2 engages with said drum and it will tend to be carried by said drum and because of this, the spherical surface 13 on the adjusting member 11 will be brought into engagement with the cooperating spherical surface 14 if it is not already so engaged. The shoe will, therefore, anchor against the spider by means of the cup-shaped portion 9. When shoe 3 engages the drum, it will also tend to rotate with the drum and the spherical surface 20 on the adjusting member 18 will be brought into engagement with the cooperating spherical surface 21. The shoe will, therefore, anchor on the cup-shaped portion 8 of the spider.

With the shoes anchored in the manner described, continued rotation of the cams will cause the cam shafts to have lateral movement and apply pressure on the notched ends of shoes 2 and 3. The cam 29 will fulcrum on the projection 22 and cam 39 will fulcrum on projection 15. The force resulting from the fulcruming action will not cause the adjusting member on the ends of the shoes to be moved away from the cup-shaped portions since the force of the cam tending to move them away is less than the force tending to hold them in engagement with their cup-shaped portions, this latter force being derived from the drum rotation. It is thus seen that the ends of the shoes provided with the adjusting members will be the anchored ends and the force applied to the shoes will be at the opposite end. Since the application force of each shoe is at the leading end of the shoe, each shoe will act as a "forward" shoe, thus producing maximum braking action.

If the drum is rotating in the direction opposite to that indicated by the arrow when the brake shoes are applied by the rotation of the cam shafts in a clockwise direction as viewed in Figure 1, then when the shoes engage the drum they will be carried by the drum so as to anchor at their notched ends. Thus shoe 2 will anchor on the cup-shaped portion 8 through cam shaft 28 and shoe 3 will anchor against the cup-shaped portion 9 through cam shaft 38. Since the cam shafts are held between the ends of the shoes and the cup-shaped portion, they will not have any lateral movement and will, therefore, rotate on a fixed axis. Continued rotation of the cam shafts will cause the cam surface 32 on cam 29 and the cam surface 42 on cam 39 to force, respectively, the projection 22 and the projection 15 on the adjusting members of shoes 3 and 2 away from the cooperating cup-shaped members and apply these shoes to the drum with greater force. Thus, for the direction of drum rotation indicated the leading ends of the shoes will receive the applying force or input and the trailing ends will be anchored. The shoes, therefore, act as "forward" shoes in the same manner as they do for the direction of rotation indicated by the arrow.

When the linings of the brake shoes become worn and it is necessary to adjust them to bring their "off" position closer to the drum, all that is necessary is to rotate the screws 48 and 49. This will cause rotation of the adjusting members 11 and 18 and swing each shoe outwardly toward the drum about the cam shaft at its notched end as a pivot. The adjusting of each shoe to compensate for lining wear does not in any way affect the operation of the brake or the relation between the shoe, the actuating cam and the members with which it cooperates. The adjustment takes place only between the end of a shoe and the member which is engaged by the cam.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, two floating shoes, two single anchor members immovably carried on the support for said shoes each projecting between a pair of adjacent ends of the shoes, a cam and cam shaft interposed between each anchor and one end of a shoe for spreading the adjacent ends of the shoes apart, each cam shaft and its cam being secured together for unitary movement at all times, and means for rotating the cam shafts simultaneously, each cam and cam shaft serving as a member through which one end of a shoe anchors on an anchor when the drum is rotating in one direction and each cam and cam shaft being free to move laterally as a unit away from its adjacent anchor when the drum is rotating in the opposite direction and the other end of each shoe anchors on an anchor.

2. In braking mechanism, a support, two floating shoes, two anchors on the support for said shoes each interposed between a pair of adjacent ends of the shoe, each anchor having a notched portion adjacent the end of one shoe and an opening therethrough, means on one end of each shoe for engaging the adjacent anchor and having a part projecting through the opening into the notched portion, the other end of each shoe having a notched portion complementary to the notched portion in the adjacent anchor, a shaft received in each pair of complementary notches on an anchor and a shoe and serving as a member through which the shoe can anchor on the anchor, said shafts being free to move laterally away from the anchors, and a cam surface on each shaft cooperating with the projecting part, and means for rotating the shafts simultaneously.

3. In braking mechanism, a support, two floating shoes, two anchors on the support for said shoes each interposed between a pair of adjacent ends of the shoe, each anchor having a notched portion adjacent the end of one shoe and an opening therethrough, an adjustable threaded member on one end of each shoe for engaging the adjacent anchor and having a part projecting through the opening into the notched portion, the other end of each shoe having a notched portion complementary to the notched portion in the adjacent anchor, a shaft received in each pair of complementary notches on an anchor and a shoe and serving as a member through which the shoe can anchor on the anchor, said shafts being free to move laterally away from the anchors, a cam surface on each shaft cooperating with the projecting part, means for rotating the shafts simultaneously, and means comprising a screw carried by the support for rotating each adjustable threaded member.

4. In braking mechanism, a drum, a support provided with diametrically positioned anchors, two symmetrical shoes each positioned between the anchors and capable of anchoring at one end on one anchor when the drum is rotating in one direction and at the other end on the other anchor when the drum is rotating in the opposite direction, a rotatable cam and cam shaft positioned between one anchor and the end of one shoe and through which said shoe anchors on the anchor, means on the adjacent end of the other shoe for cooperation with the cam, a second rotatable cam and cam shaft positioned between the other anchor and the end of the other shoe and through which said shoe anchors on the anchor, means on the adjacent end of the first named shoe for cooperation with the cam, each cam and shaft being free to move laterally away from its adjacent anchor when not held against said anchor by the shoe which anchors through it, and means for simultaneously rotating said cam shafts for causing each cam to spread apart the ends of the shoes with which it cooperates.

5. In braking mechanism, a drum, a support provided with diametrically positioned anchors, two symmetrical shoes each positioned between the anchors and capable of anchoring at one end on one anchor when the drum is rotating in one direction and at the other end on the other anchor when the drum is rotating in the opposite direction, a rotatable cam and cam shaft positioned between one anchor and the end of one shoe and through which said shoe anchors on the anchor, means on the adjacent end of the other shoe for cooperation with the cam, a second rotatable cam and cam shaft positioned between the other anchor and the end of the other shoe and through which said shoe anchors on the anchor, means on the adjacent end of the first named shoe for cooperation with the cam, each cam and shaft being free to move laterally away from its adjacent anchor when not held against said anchor by the shoe which anchors through it, means for simultaneously rotating said cam shafts for causing each cam to spread apart the ends of the shoes with which it cooperates, and independent adjustable means for each shoe, each adjustable means comprising a member between an anchor and a shoe for moving said shoe relatively to the anchor and without changing the relationship between the cam and the means on the shoe with which the cam cooperates.

6. An actuating means for a brake embodying a pair of shoes which have adjacent ends, one of which anchors in one direction of rotation of the drum and the other of which anchors in the other direction of rotation of the drum, said means comprising a support, a single anchor member immovably carried on the support projecting between the shoe ends, means on the end of one shoe capable of directly abutting the anchor, a rotatable shaft and a cam secured thereto for unitary movement at all times, said shaft and cam being capable of movement away from the anchor and being interposed between the anchor and the end of the other shoe to act as a medium through which the said other shoe anchors on the anchor, said cam having a surface for engaging the means on the end of the shoe which directly abuts the anchor to thereby spread the shoe ends apart when the shaft is rotated, and means for rotating the shaft.

7. An actuating means for a brake embodying a pair of shoes which have adjacent ends, one of which anchors in one direction of rotation of the drum and the other of which anchors in the other direction of rotation of the drum, said means comprising a support, an anchor on the support provided with a curved surface on one side, an opening therein and a semi-annular bearing surface on the other side, means carried on the end of one shoe having a curved surface for engaging the curved surface of the anchor and a projection extending through the opening, a shaft positioned in the semi-annular surface and adapted to be abutted by the end of the other shoe, said shaft being free to move away from the anchor, a cam on the shaft having a cam surface for engaging the projection on the first named shoe for spreading the ends of the shoes apart when the shaft is rotated, and means for rotating the shaft.

8. An actuating and adjusting means for a brake embodying a pair of shoes which have adjacent ends, one of which anchors in one direction of rotation of the drum and the other of which anchors in the other direction of rotation of the drum, said means comprising a support, a cup-shaped anchor on the support provided with a spherical bottom, an opening therethrough and a semi-annular notched surface on the side opposite the spherical bottom, means on one shoe end having a spherical surface engaging the spherical bottom of the cup and a projection extending through the opening, said other shoe having a semi-annular notched surface complementary to the first named notched surface, a shaft positioned between said notched surfaces and through which the said notched shoe anchors on the anchor, a cam surface on the shaft for engaging the projection on the screw to spread the shoe ends apart when the shaft is rotated, and means for rotating the shaft.

9. An actuating and adjusting means for a brake embodying a pair of shoes which have adjacent ends, one of which anchors in one direction of rotation of the drum and the other of which anchors in the other direction of rotation of the drum, said means comprising a support, a cup-shaped anchor on the support provided with a spherical bottom, an opening therethrough and a semi-annular notched surface on the side opposite the spherical bottom, a threaded member on one shoe end provided with gear teeth having a spherical surface engaging the spherical bottom of the cup and a projection extending through the opening, a screw mounted on the support for engaging the teeth and rotating the threaded member to adjust the shoe end with respect to the anchor, said screw so cooperating with the teeth on the threaded member as to permit movement of the member with the shoe when the shoe is actuated, said other shoe having a semi-annular notched surface complementary to the first named notched surface, a shaft positioned between said notched surfaces and through which the said notched shoe anchors on the anchor, a cam surface on the shaft for engaging the projection on the screw to spread the shoe ends apart when the shaft is rotated, and means for rotating the shaft.

WERNER F. BOLDT.